UNITED STATES PATENT OFFICE.

EDUARD HEPP, OF FRANKFORT-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

PROCESS OF MAKING POLYAMIDOANTHRAQUINONE-SULFO-ACIDS.

SPECIFICATION forming part of Letters Patent No. 713,432, dated November 11, 1902.

Application filed August 21, 1902. Serial No. 120,499. (Specimens.)

*To all whom it may concern:*

Be it known that I, EDUARD HEPP, Ph. D., a citizen of the Empire of Germany, residing at Frankfort-on-the-Main, Germany, have invented certain new and useful Improvements in the Manufacture of Polyamidoanthraquinone-Sulfo-Acids, of which the following is a specification.

I have shown in my application for Letters Patent, Serial No. 65,341, of June 20, 1901, that polyamidoanthraquinone-sulfo-acids, being very valuable coloring-matters, may be obtained by causing sulfonating agents to act on such polyamidoanthraquinones as are produced by reducing the nitroamidoanthraquinones described in the said application.

My new process consists in obtaining polyamidoanthraquinone-sulfo-acids of very similar properties by treating the above-mentioned nitroamidoanthraquinones with alkali sulfites. In carrying out my invention I start generically from the acyl derivatives of alpha-amidoanthraquinones. (By "alpha-amidoanthraquinones" are meant alpha-monoamidoanthraquinone, 1:5 or 1:8 diamidoanthraquinone or the mixture of amidoanthraquinones obtained by reducing the crude product of the nitration of anthraquinone.) By treating these acyl derivatives with nitric acid in suitable proportions I obtain the acylated nitroamidoanthraquinones. I then eliminate the acyl group by treating the acylated compounds with saponifying agents, such as acids or alkalies, and finally I treat the resulting nitroamidoanthraquinones with alkali sulfites.

The following example will serve to further illustrate the manner in which my invention can be carried out in order to prepare the tetramidoanthraquinone-sulfo-acids by means of the diamidoanthraquinone.

Twenty-five kilos, by weight, of diamidoanthraquinone obtained by reducing the crude dinitroanthraquinone are heated in a vessel provided with a reflux condenser with one hundred kilos, by weight, of crystallized oxalic acid until none of the original material is left unchanged. The mass is then heated with water to remove any excess of oxalic acid, the residue is dried, and after being dissolved in four hundred and fifty kilos, by weight, of sulfuric acid of 66° Baumé specific gravity the requisite calculated quantity of a mixture of sulfuric and nitric acids is slowly introduced into the solution cooled to 5° centigrade. After standing for some hours the nitration may be considered as complete and the solution is poured into ice-water. Thus a precipitate of an orange-yellow color is separated, consisting of oxamic acids of dinitrodiamidoanthraquinones. These acids are little soluble in pure water, but readily soluble in a solution of sodium acetate and in cold solutions of alkali carbonates. If these solutions are heated with an excess of alkali carbonates, or if, even when cold, caustic alkali is added, the dinitrodiamidoanthraquinones separate as red brilliant crystals.

In order to reduce the dinitrodiamidoanthraquinone and to introduce the sulfo group at the same time, one part, by weight, of dinitrodiamidoanthraquinone is heated in a vessel provided with a reflux condenser with eight parts, by weight, of a solution of sodium bisulfite of 40° Baumé specific gravity till a test portion no longer shows the presence of the original material. The blue solution is then diluted with water and heated with hydrochloric acid. After cooling, the dark bluish-violet precipitate is filtered, dissolved in sodium acetate, and the blue solution is precipitated with common salt. The product of these operations consists of a mixture of the sodium salts of different sulfonic acids, which need not be separated for their use in dyeing. The dyestuffs thus obtained dye wool in an acid-bath pure-blue level shades, which are specially distinguished by their fastness to light.

The free sulfo-acids when dry represent a blackish powder. They are dissolved by anilin, pyridin, and dilute alkalies, such as ammonia-liquor or carbonate-of-soda solution or caustic-soda lye to a blue solution, the solution in caustic-soda lye turning red by means of zinc-dust and assuming after filtration the original coloration when exposed to air. The alkali salts are dark-blue powders soluble in water with a pure-blue color, which is changed into red by the addition of strong hydrochloric acid, the free sulfo-acids being separated as a dark bluish-violet precipitate. By concentrated sulfuric acid they are dissolved, yielding an almost colorless solution, which practically shows a feeble brown tint, the color of which changes first into violet and then into red if the solution is diluted with water, the sulfo-acids being thus separated.

Having now described my invention, what I claim is—

1. The herein-described process for producing new polyamidoanthraquinone-sulfo-acids containing at least two amido groups in position 1:4, which process consists in first treating acyl derivatives of alpha-amidoanthraquinones with nitric acid, secondly eliminating the acyl group by a saponifying agent and finally heating the nitroamidoanthraquinones thus obtained with alkali sulfites, substantially as set forth.

2. The herein-described process for producing a new polyamidoanthraquinone-sulfo-acid, which process consists in first treating acyl derivatives of diamidoanthraquinone with two molecules of nitric acid, secondly in eliminating the acyl group by treating by a saponifying agent, thirdly in heating the dinitrodiamidoanthraquinone thus obtained with alkali sulfites, substantially as set forth.

3. The herein-described new dyestuff sulfonic acids, obtainable by treating para-nitroamidoanthraquinones with alkali sulfites, which dyestuffs in form of their alkaline salts are soluble in water with a bluish-violet to pure blue color becoming red by adding strong hydrochloric acid and yielding with concentrated sulfuric acid (66° Baumé specific gravity) an almost colorless solution, giving with dilute alkalies solutions becoming red by means of zinc-dust and assuming after filtration the original color when exposed to the air; dyeing unmordanted wool in acid-baths from bluish-violet to pure-blue even shades which are distinguished by their fastness to light, substantially as set forth.

4. The herein-described new dyestuff sulfonic acid, obtainable by treating the dinitrodiamidoanthraquinone with alkali sulfites, which dyestuff in form of its alkaline salts is a dark-blue powder soluble in water with a pure-blue color, which becomes red by adding strong hydrochloric acid, the free sulfo-acid being separated as a dark bluish-violet precipitate, yielding with concentrated sulfuric acid an almost colorless solution, showing practically a feeble brown tint, the color of which changes first into violet and then into red on the solution being diluted with water, the sulfo-acids being separated; giving with dilute alkalies solutions which become red by means of zinc-dust and assume afterward the original color when exposed to the air; dyeing unmordanted wool in an acid-bath pure-blue even shades which are distinguished by their fastness to light, substantially as set forth.

In testimony that I claim the foregoing as my invention I have signed my name in presence of two subscribing witnesses.

EDUARD HEPP.

Witnesses:
ALFRED BRISBOIS,
JOHANN HARTENSTEIN.